(12) United States Patent
Ito et al.

(10) Patent No.: US 11,390,280 B2
(45) Date of Patent: Jul. 19, 2022

(54) DRIVING ASSISTANCE APPARATUS

(71) Applicant: Toyota Jidosha Kabushiki Kaisha, Toyota (JP)

(72) Inventors: Shogo Ito, Shizuoka-ken (JP); Hirotada Otake, Shizuoka-ken (JP); Kohei Tochigi, Susono (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/743,757

(22) Filed: Jan. 15, 2020

(65) Prior Publication Data
US 2020/0231156 A1    Jul. 23, 2020

(30) Foreign Application Priority Data
Jan. 17, 2019 (JP) .............................. JP2019-006237

(51) Int. Cl.
| | |
|---|---|
| *B60W 30/18* | (2012.01) |
| *B60W 10/04* | (2006.01) |
| *B60W 10/18* | (2012.01) |
| *B60W 50/00* | (2006.01) |

(52) U.S. Cl.
CPC ...... *B60W 30/18009* (2013.01); *B60W 10/04* (2013.01); *B60W 10/18* (2013.01); *B60W 50/00* (2013.01); *B60W 2552/05* (2020.02); *B60W 2710/18* (2013.01); *B60W 2720/106* (2013.01)

(58) Field of Classification Search
CPC ................................................ B60W 2552/05
See application file for complete search history.

(56) References Cited

U.S. PATENT DOCUMENTS

| | | | |
|---|---|---|---|
| 2009/0138168 A1* | 5/2009 | Labuhn ................ | B60W 30/17 701/93 |
| 2012/0053807 A1* | 3/2012 | Salinger .............. | B60W 50/087 701/93 |
| 2013/0211687 A1* | 8/2013 | Trost .................... | B60T 7/22 701/70 |
| 2016/0264139 A1* | 9/2016 | Gauthier ............... | B60W 30/09 |
| 2018/0281781 A1* | 10/2018 | Kim ...................... | B60W 50/14 |

FOREIGN PATENT DOCUMENTS

| | | |
|---|---|---|
| JP | 2007-066179 A | 3/2007 |
| JP | 2018-131027 A | 8/2018 |

\* cited by examiner

*Primary Examiner* — Anshul Sood
(74) *Attorney, Agent, or Firm* — Dinsmore & Shohl LLP

(57) ABSTRACT

A driving assistance apparatus is provided with: a recognizer configured to recognize a surrounding situation of a host vehicle; a controller programmed to execute a deceleration assistance control of assisting in decelerating a host vehicle when a predetermined condition is satisfied; a determinator configured to determine whether or not the host vehicle is traveling on a roadway on the basis of the recognized surrounding situation; and a restraining device configured to restrain execution of the deceleration assistance control by a controller if it is determined that the host vehicle is not traveling on a roadway, in comparison with a situation in which it is determined that the host vehicle is traveling on a roadway.

8 Claims, 3 Drawing Sheets

DRIVING ASSISTANCE APPARATUS

CROSS-REFERENCE TO RELATED APPLICATIONS

This application is based upon and claims the benefit of priority of the prior Japanese Patent Application No. 2019-006237, filed on Jan. 17, 2019, the entire contents of which are incorporated herein by reference.

BACKGROUND

1. Technical Field

Embodiments of the present disclosure relate to a driving assistance apparatus, and particularly relate to a driving assistance apparatus configured to provide deceleration assistance.

2. Description of the Related Art

For this type of apparatus, for example, there is proposed an apparatus configured to perform a deceleration control on a host vehicle if it is determined that the host vehicle is in a situation in which it is to be decelerated or to be stopped (refer to Japanese Patent Application Laid Open No. 2018-131027 (Patent Literature 1)).

In some cases, vehicles also travel in a place other than a roadway, such as, for example, in a parking lot. In a technology/technique described in the Patent Literature 1, if it is determined that the host vehicle is in the situation in which it is to be decelerated or to be stopped, for example, due to parked vehicles, then, the deceleration control may be performed even in the place other than the roadway. On the other hand, a driver may feel discomfort if the deceleration control is performed when driving the host vehicle in the place other than the roadway, after confirming that the host vehicle can safely travel, or after recognizing an explicit and/or potential risk. In other words, the technology/technique described in the Patent Literature 1 has such a technical problem that the driver may feel discomfort even though the deceleration control is correctly performed (i.e., the apparatus is operated according to specifications) in the place other than the roadway.

SUMMARY

In view of the problem described above, it is therefore an object of embodiments of the present disclosure to provide a driving assistance apparatus that can provide deceleration assistance while preventing a driver from feeling discomfort.

The above object of embodiments of the present disclosure can be achieved by a driving assistance apparatus provided with: a controller programmed to execute a deceleration assistance control of assisting in decelerating a host vehicle when a predetermined condition is satisfied; a determinator configured to determine whether or not the host vehicle is traveling on a roadway; and a restraining device configured to restrain execution of the deceleration assistance control by the controller if it is determined that the host vehicle is not traveling on a roadway, in comparison with a situation in which it is determined that the host vehicle is traveling on a roadway.

The above object of embodiments of the present disclosure can be also achieved by a driving assistance apparatus provided with: a controller programmed to execute a deceleration assistance control of assisting in decelerating a host vehicle when a predetermined condition is satisfied; a determinator configured to determine whether or not the host vehicle is in a parking lot; and a restraining device configured to restrain execution of the deceleration assistance control by the controller if it is determined that the host vehicle is in a parking lot, in comparison with a situation in which it is determined that the host vehicle is not in a parking lot.

DETAILED DESCRIPTION OF THE EMBODIMENTS

A driving assistance apparatus according to embodiments of the present disclosure will be explained with reference to the drawings.

First Embodiment

A driving assistance apparatus according to a first embodiment will be explained with reference to FIG. 1 and FIG. 2.

(Configuration)

A configuration of the driving assistance apparatus according to the first embodiment will be explained with reference to FIG. 1. FIG. 1 is a block diagram illustrating the configuration of the driving assistance apparatus according to the first embodiment.

Figure 1:
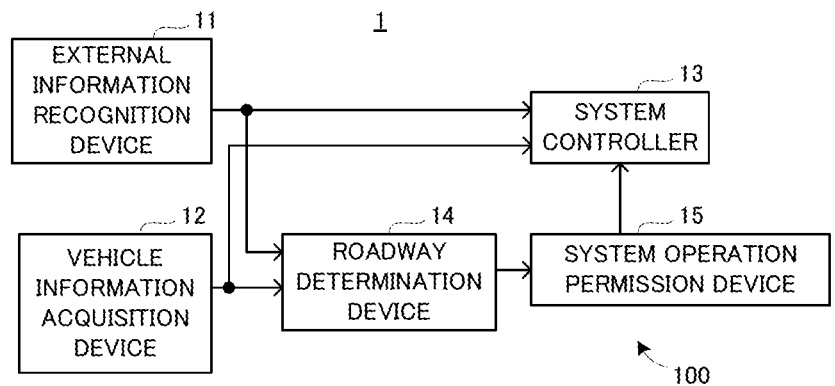
FIG. 1 is a block diagram illustrating a configuration of a driving assistance apparatus according to a first embodiment.

In FIG. 1, a driving assistance apparatus 100 is provided with an external information recognition device 11, a vehicle information acquisition device 12; a system controller 13, a roadway determination device 14, and a system operation permission device 15.

The external information recognition device 11 is configured to recognize a surrounding situation of the vehicle 1, on the basis of an output of a device configured to detect an external situation of the vehicle 1, such as, for example, a millimeter wave radar, a camera, and light detection and ranging (LiDAR). The external information recognition device 11 may further recognize the surrounding situation of the vehicle 1, for example, on the basis of map information, information obtained by road vehicle communication and vehicle-vehicle communication, or the like. A detailed explanation of a method of recognizing the surrounding situation will be omitted because various existing aspects can be applied to the method.

The vehicle information acquisition device 12 is configured to obtain vehicle information, which indicates a state of the vehicle 1, from an output of a device configured to detect the state of the vehicle 1, such as, for example, a vehicle wheel speed sensor, an accelerator pedal sensor, a brake pedal sensor, and a steering angle sensor. A detailed explanation of a method of obtaining the vehicle information will be omitted because various existing aspects can be applied to the method.

The system controller 13 is configured to execute a deceleration assistance control of decelerating the vehicle 1 when a predetermined condition is satisfied. Specifically, the system controller 13 may arithmetically operate a deceleration assistance amount associated with the deceleration assistance control (e.g., a magnitude of a braking force caused by the deceleration assistance control, etc.) and may control the vehicle 1 to realize target deceleration corresponding to the deceleration assistance amount arithmetically operated. For example, the system controller 13 may control a brake actuator, change an engine output, or execute a regenerative control on a motor.

Now, an explanation will be given to the predetermined condition. In the first embodiment, the deceleration assistance control may be executed when the following three conditions are satisfied: (i) a deceleration target is recognized, (ii) a distance between the vehicle 1 and the recognized deceleration target is less than or equal to a predetermined distance, and (iii) a driver does not step on any of an accelerator pedal and a brake pedal.

The "deceleration target" may be something that requires the vehicle 1 to decelerate or stop. Specifically, an example includes: an obstacle, such as, for example, another vehicle, a pedestrian, and a structure; something that regulates travel of the vehicle 1, such as, for example, a road sign, a red light, and a stop line; and a road structure, such as, for example, an intersection and a curve.

The system controller 13 is configured to determine whether or not the predetermined condition (which are the conditions (i) to (iii) described above) is satisfied, on the basis of the surrounding situation recognized by the external information recognition device 11 and the vehicle information obtained by the vehicle information acquisition device 12.

The roadway determination device 14 is configured to determine whether or not the vehicle 1 is traveling on a roadway, on the basis of at least one of the surrounding situation recognized by the external information recognition device 11 and the vehicle information obtained by the vehicle information acquisition device 12. Specifically, the roadway determination device 14 may determine that the vehicle 1 is traveling on a roadway, if any or a combination of the following conditions is satisfied; for example, "a speed of the vehicle 1 is greater than or equal to 50 km/h", "there is another vehicle (i.e., a preceding vehicle) that travels at a speed of 20 km/h or more ahead of the vehicle 1 in a course thereof", "there is a traffic light or a stop sign ahead of the vehicle 1 in the course thereof", "there is a white line for defining a traffic lane on which the vehicle 1 travels", and "the vehicle 1 is located on a roadway in view of the map information and position information indicating a position of the vehicle 1".

Moreover, the roadway determination device 14 may determine that the vehicle 1 is not traveling on a roadway, if any or a combination of the following conditions is satisfied; for example, "it is immediately after switching from ignition off to ignition on or a certain time has not passed since the switching", "a door of the vehicle 1 is open and/or the driver does not fasten a seatbelt", "a shift position is in a D range and a state of being 0 km/h continues for a first predetermined time (e.g. several minutes) or longer", "the shift position is in an N range and the state of being 0 km/h continues for a second predetermined time or longer (wherein the second predetermined time<the first predetermined time)", "it is 0 km/h after the vehicle 1 is driven in reverse", and "the vehicle 1 is located in a place other than a roadway in view of the map information and the position information indicating the position of the vehicle 1".

The roadway determination device 14 is configured to periodically determine whether or not the vehicle 1 is traveling on a roadway. If the conditions for determining that the vehicle 1 is traveling on a roadway are not satisfied and if the conditions for determining that the vehicle 1 is not traveling on a roadway are also not satisfied, then, the roadway determination device 14 may adopt a previous determination result (i.e. a determination result one cycle before) as a current determination result.

The system operation permission device 15 is configured to turn on a function of the system controller 13 associated with execution of the deceleration assistance control if it is determined by the roadway determination device 14 that the vehicle 1 is not traveling on a roadway. Moreover, if it is determined by the roadway determination device 14 that the vehicle 1 is traveling on a roadway when the function is off, the system operation permission device 15 is configured to turn on the function.

(Operations)

With reference to a flowchart in FIG. 2, an explanation will be given to operations of the driving assistance apparatus 100.

Figure 2:
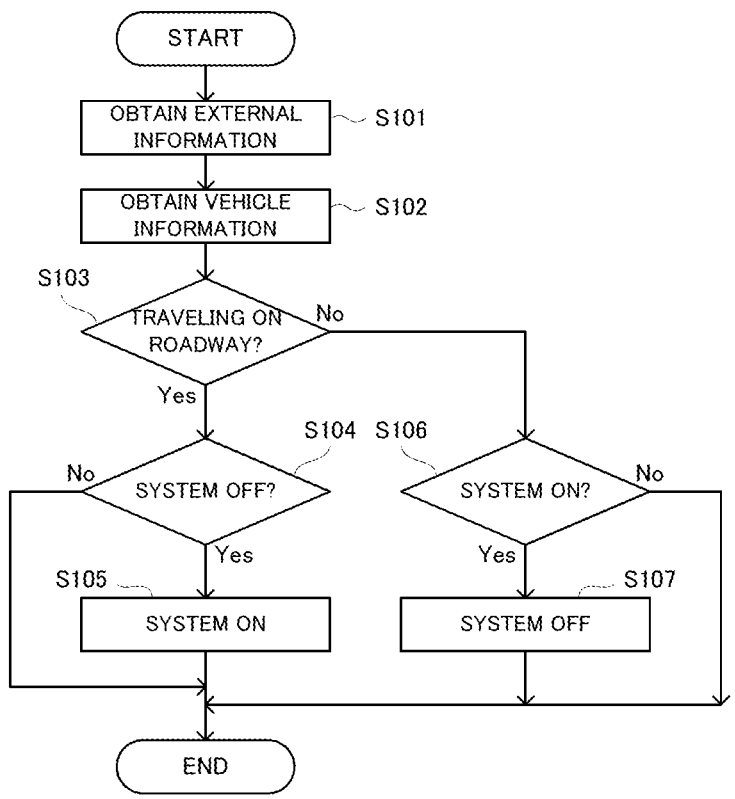
FIG. 2 is a flowchart illustrating operations of the driving assistance apparatus according to the first embodiment.

In FIG. 2, the roadway determination device 14 obtains the surrounding situation recognized by the external information recognition device 11 (i.e., external information) (step S101) and obtains the vehicle information obtained by the vehicle information acquisition device 12 (step S102).

The roadway determination device 14 then determines whether or not the vehicle 1 is traveling on a roadway (step S103). In the step S103: if it is determined that the vehicle 1 is traveling on a roadway (the step S103: Yes), the system operation permission device 15 determines whether or not the function of the system controller 13 associated with the execution of the deceleration assistance control is off (step S104).

In the step S104, if it is determined that the function is not off (i.e., is on) (the step S104: No), the operations illustrated in FIG. 2 are ended. Then, after a lapse of a predetermined period (e.g., several ten milliseconds to several hundred milliseconds), the step S101 is executed. In other words, the operations illustrated in FIG. 2 are repeated with a period corresponding to the predetermined time. In the step S104, if it is determined that the function is off (the step S104: Yes), the system operation permission device 15 turns on the function (step S105). Then, after a lapse of a predetermined period, the step S101 is executed.

In the step S103, if it is determined that the vehicle 1 is not traveling on a roadway (the step S103: No), the system operation permission device 15 determines whether or not the function of the system controller 13 associated with the execution of the deceleration assistance control is on (step S106).

In the step S106, if it is determined that the function is not on (i.e., is off) (the step S106: No), the operations illustrated in FIG. 2 are ended. Then, after a lapse of a predetermined period, the step S101 is executed. In the step S106, if it is determined that the function is on (the step S106: Yes), the system operation permission device 15 turns off the function (step S107). Then, after a lapse of a predetermined period, the step S101 is executed.

(Technical Effect)

On the driving assistance apparatus 100, when the vehicle 1 is traveling on a roadway, the function of the system controller 13 associated with the execution of the deceleration assistance control is turned on. Thus, the deceleration assistance control is executed when the predetermined condition is satisfied. In other words, according to the driving assistance apparatus 100, it is possible to appropriately execute the deceleration assistance control when the vehicle 1 is traveling on a roadway.

On the other hand, on the driving assistance apparatus 100, when the vehicle 1 is not traveling on a roadway (i.e., when the vehicle 1 is traveling in a place other than a roadway), the function of the system controller 13 associated with the execution of the deceleration assistance control is turned off. Thus, the deceleration assistance control is not executed. In other words, according to the driving assistance apparatus 100, it is possible to prevent the driver from feeling discomfort due to the deceleration assistance control when the vehicle 1 is traveling in a place other than a roadway.

In addition, the on and off of the function of the system controller 13 associated with the execution of the deceleration assistance control may be automatically switched. It is thus possible to reduce time and effort of the driver, in comparison with a configuration according to a comparative example in which the driver switches the function from on to off or from off to on.

FIRST MODIFIED EXAMPLE

With reference to a flowchart in FIG. 3, an explanation will be given to operations of the driving assistance apparatus 300 according to a first modified example.

Figure 3:
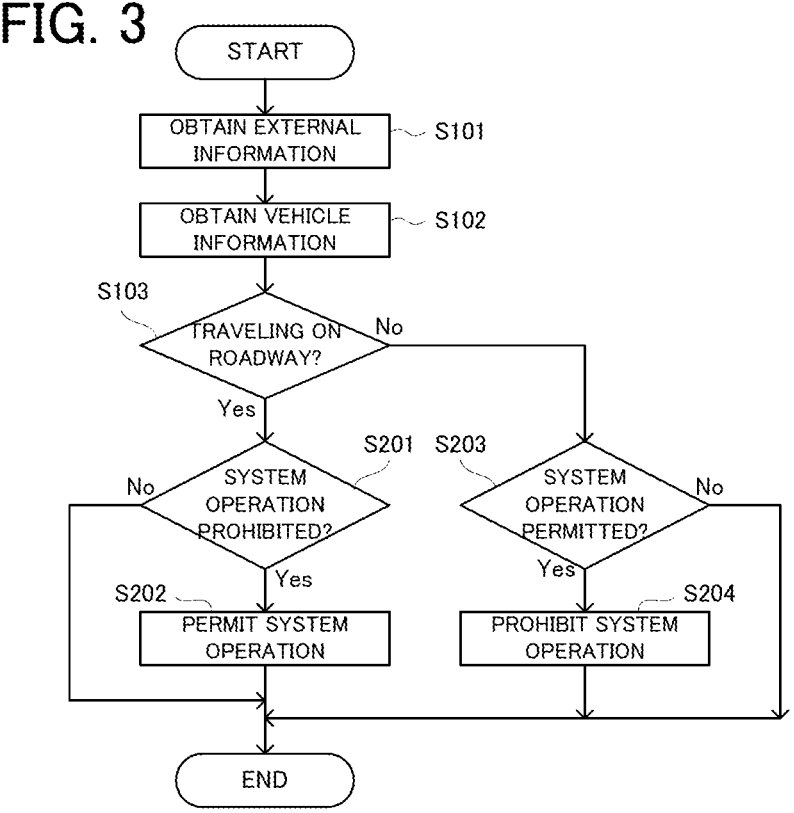
FIG. 3 is a flowchart illustrating operations of a driving assistance apparatus according to a first modified example of the first embodiment.

In the step S103 in FIG. 3, if it is determined that the vehicle 1 is traveling on a roadway (the step S103: Yes), the system operation permission device 15 determines whether or not the execution of the deceleration assistance control by the system controller 13 is prohibited (step S201).

In the step S201, if it is determined that the execution of the deceleration assistance control is not prohibited (the step S201: No), the operations illustrated in FIG. 3 are ended. In the step S201, if it is determined that the execution of the deceleration assistance control is prohibited (the step S201: Yes), the system operation permission device 15 permits the execution of the deceleration assistance control (step S202).

In the step S103 in FIG. 3, if it is determined that the vehicle 1 is not traveling on a roadway (the step S103: No), the system operation permission device 15 determines whether or not the execution of the deceleration assistance control by the system controller 13 is permitted (step S203).

In the step S203, if it is determined that the execution of the deceleration assistance control 13 is not permitted (the step S203: No), the operations illustrated in FIG. 3 are ended. In the step S203, if it is determined that the execution of the deceleration assistance control is permitted (the step S203: Yes), the system operation permission device 15 prohibits the execution of the deceleration assistance control (step S204).

SECOND MODIFIED EXAMPLE

With reference to a flowchart in FIG. 4, an explanation will be given to operations of the driving assistance apparatus 100 according to a second modified example.

Figure 4:
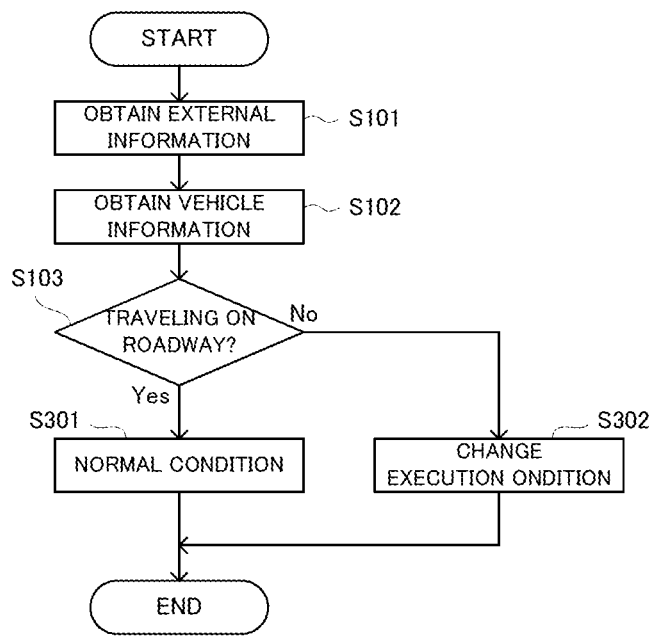
FIG. 4 is a flowchart illustrating operations of a driving assistance apparatus according to a second modified example of the first embodiment.

In the step S103 in FIG. 4, if it is determined that the vehicle 1 is traveling on a roadway (the step S103: Yes), the system operation permission device 15 sets the predetermined condition (i.e., a condition for determining whether or not the deceleration assistance control is to be executed) to a normal condition (step S301).

On the other hand, in the step S103, if it is determined that the vehicle 1 is not traveling on a roadway (the step S103: No), the system operation permission device 15 changes the predetermined condition (step S302).

Specifically, for example, the system operation permission device 15 may reduce the "predetermined distance", which is written in the condition "(ii) the distance between the vehicle 1 and the recognized deceleration target is less than or equal to the predetermined distance" included in the predetermined condition, in comparison with those when it is determined that the vehicle 1 is traveling on a roadway. By virtue of such a configuration, if it is determined that the vehicle 1 is not traveling on a roadway, it is possible to make it difficult to satisfy the predetermined condition, in comparison with the situation in which it is determined that the vehicle 1 is traveling on a roadway. As a result, if it is determined that the vehicle 1 is not traveling on a roadway, the execution of the deceleration assistance control is restrained, and it is thus possible to prevent the driver from feeling discomfort due to the deceleration assistance control.

THIRD MODIFIED EXAMPLE

If it is determined that the vehicle 1 is not traveling on a roadway, the system operation permission device 15 may set the system controller 13 into a non-standby state in which the deceleration assistance control is not executed even if the predetermined condition (i.e., the condition for determining whether or not the deceleration assistance control is to be executed) is satisfied, instead of turning off the function of the system controller 13 associated with the execution of the deceleration assistance control. In the non-standby state, the function described above is in an on state. Moreover, if it is determined that the vehicle 1 is traveling on a roadway, the system operation permission device 15 may set the system controller 13 into a standby state in which the deceleration assistance control is executed if only the predetermined condition is satisfied, instead of turning on the function described above.

Second Embodiment

Figure 5:
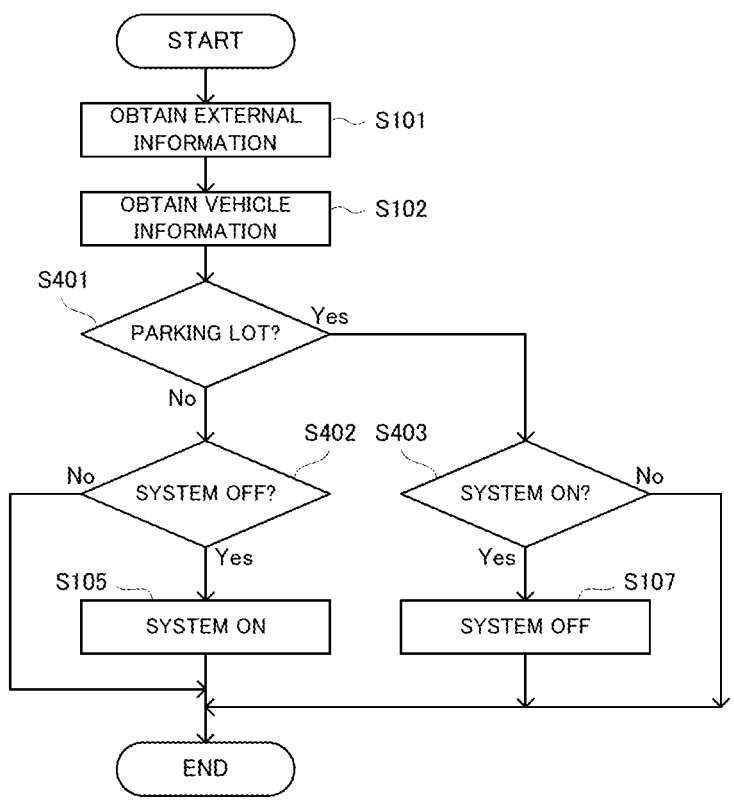
FIG. 5 is a flowchart illustrating operations of a driving assistance apparatus according to a second embodiment.

A driving assistance apparatus according to a second embodiment will be explained with reference to FIG. 5. The second embodiment is the same as the first embodiment, except that the operations of the roadway determination device 14 and the system operation permission device 15 are partially different. Therefore, in the second embodiment, the same explanation as those in the first embodiment will be omitted. The same parts on the drawing will carry the same reference numerals and basically different points will be explained with reference to FIG. 5.

In the explanation described above, the roadway determination device 14 is configured to determine whether or not the vehicle 1 is traveling on a roadway. Here, an example of a scene in which the vehicle 1 is not traveling on a roadway may include a scene in which the vehicle 1 is traveling in a parking lot. In fact, the scene in which the vehicle 1 is traveling in a parking lot is often seen as the scene in which the vehicle 1 is not traveling on a roadway. Thus, in the second embodiment, after the step S102 in FIG. 5, the roadway determination device 14 determines whether or not the vehicle 1 is in a parking lot, to thereby determine whether or not the vehicle 1 is traveling on a roadway (step S401).

Here, the roadway determination device 14 may determine that the vehicle 1 is in a parking lot (as a result of which, the vehicle 1 is not traveling on a roadway) if any or a combination of the following conditions is satisfied; for example, "a door of the vehicle 1 is open and/or the driver does not fasten a seatbelt", "a shift position is in a D range and a state of being 0 km/h continues for a first predetermined time (e.g. several minutes) or longer", "the shift position is in an N range and the state of being 0 km/h continues for a second predetermined time or longer (wherein the second predetermined time<the first predetermined time)", and "it is 0 km/h after the vehicle 1 is driven in reverse". In other words, the roadway determination device 14 may determine whether or not the vehicle 1 is in a parking lot by using the same conditions as those used to determine whether or not the vehicle 1 is traveling on a roadway in the step S103 in FIG. 2 described above. Alternatively, the roadway determination device 14 may determine that the vehicle 1 is in a parking lot (as a result of which, the vehicle 1 is not traveling on a roadway) if any or a combination of the following conditions is satisfied in addition to or instead of at least one of the aforementioned conditions; for example, "the vehicle 1 is located in a place other than a roadway in view of the map information and the position information indicating the position of the vehicle 1", "a frame line for defining a parking space is recognized", "a white line with a predetermined length or less is recognized", and "a predetermined number or more of stop vehicles without brake lamps being on are recognized".

Moreover, the roadway determination device 14 may determine that the vehicle 1 is not in a parking lot (as a result of which, the vehicle 1 is traveling on a roadway or is relatively likely traveling on a roadway) if any or a combination of the following conditions is satisfied; for example, "the speed of the vehicle 1 is greater than or equal to 50 km/h", "there is another vehicle (i.e., a preceding vehicle) that travels at a speed of 20 km/h or more ahead of the vehicle 1 in a course thereof", "there is a traffic light or a stop sign ahead of the vehicle 1 in the course thereof", "there is a white line for defining a traffic lane on which the vehicle 1 travels", and "the vehicle 1 is located on a roadway in view of the map information and the position information indicating the position of the vehicle 1".

In the step S401, if it is determined that the vehicle 1 is not in a parking lot (the step S401: No), the system operation permission device 15 determines whether or not the function of the system controller 13 associated with the execution of the deceleration assistance control is off (step S402).

In the step S402, if it is determined that the function described above is not off (i.e., is on) (the step S402; No), the operations illustrated in FIG. 5 are ended. In the step S402, if it is determined that the function described above is off (the step S402: Yes), the step S105 is executed.

In the step S401, if it is determined that the vehicle 1 is in a parking lot (the step S401: Yes), the system operation permission device 15 determines whether or not the function of the system controller 13 associated with the execution of the deceleration assistance control is on (step S403).

In the step S403, if it is determined that the function described above is not on (i.e., is off) (the step S403: No), the operations illustrated in FIG. 5 are ended. In the step S403, if it is determined that the function described above is on (the step S403: Yes), the step S107 is executed.

(Technical Effect)

In a place other than a roadway, especially in a parking lot, the deceleration assistance control may be excessively executed due to parked vehicles. Therefore, as described above, if the function of the system controller 13 associated with the execution of the deceleration assistance control is turned off when it is determined that the vehicle 1 is in a parking lot, it is possible to prevent the driver from feeling discomfort due to the execution of the driving assistance control.

Various aspects of embodiments of the present disclosure derived from the embodiments and modified examples explained above will be explained hereinafter.

A driving assistance apparatus according to an aspect of embodiments of the present disclosure is provided with: a controller programmed to execute a deceleration assistance control of assisting in decelerating a host vehicle when a predetermined condition is satisfied; a determinator configured to determine whether or not the host vehicle is traveling on a roadway; and a restraining device configured to restrain execution of the deceleration assistance control by the controller if it is determined that the host vehicle is not traveling on a roadway, in comparison with a situation in which it is determined that the host vehicle is traveling on a roadway.

In the embodiments described above, the "system controller 13" corresponds to an example of the "controller", the "roadway determination device 14" corresponds to an example of the "determinator", and the "system operation permission device 15" corresponds to an example of the "restraining device".

The controller is programmed to execute a deceleration assistance control when a predetermined condition is satisfied. The "predetermined condition" may be a condition for determining whether or not the deceleration assistance control to be executed. Such a "predetermined condition" may be set, for example, as a condition that allows determination of a situation in which the host vehicle is to be decelerated or to be stopped, by experiments, experiences, or simulations.

The determinator is configured to determine whether or not the host vehicle is traveling on a roadway. The determinator may determine that the host vehicle is traveling on a roadway, for example, on condition that a traffic light, a white line for defining a traffic lane, or the like, is recognized. The determinator may determine whether or not the host vehicle is traveling on a roadway, on the basis of a state of the host vehicle (e.g., a speed, etc.).

The restraining device is configured to restrain execution of the deceleration assistance control by the controller if it is determined that the host vehicle is not traveling on a roadway, in comparison with a situation in which it is determined that the host vehicle is traveling on a roadway. Here, the expression "to restrain execution of the deceleration assistance control" may conceptually include not only "to make it difficult to execute the deceleration assistance control", but also "not to allow the deceleration assistance control to be executed (e.g., to prevent the deceleration assistance control from being executed)".

When the host vehicle is traveling in a place other than a roadway, such as, for example, a parking lot", the deceleration assistance control is executed in some cases even though a driver does not expect it. In this case, the driver may feel discomfort in the deceleration assistance control.

On the driving assistance apparatus, as described above, if it is determined that the host vehicle is not traveling on a roadway, the execution of the deceleration assistance control by the controller is restrained, in comparison with the situation in which it is determined that the host vehicle is traveling on a roadway. On the other hand, if it is determined that the host vehicle is traveling on a roadway, the execution of the deceleration assistance control by the controller is not restrained, in comparison with a situation in which it is determined that the host vehicle is not traveling on a roadway. Therefore, according to the driving assistance apparatus, it is possible to execute the deceleration assistance control while preventing the driver from feeling discomfort.

In an aspect of the driving assistance apparatus, the restraining device is configured to prohibit the execution of the deceleration assistance control by the controller if it is determined that the host vehicle is not traveling on a roadway. In this aspect, the execution of the deceleration assistance control is prohibited if it is determined that the host vehicle is not traveling on a roadway. It is thus possible to prevent the driver from feeling discomfort due to the deceleration assistance control when the host vehicle is not traveling on a roadway.

In this aspect, if it is determined that the host vehicle is traveling on a roadway when the execution of the deceleration assistance control is prohibited, the restraining device may be configured to release prohibition of the execution of the deceleration assistance control by the controller. In other words, when the host vehicle moves from a place other than a roadway (i.e., a place in which it is determined by the determinator that the host vehicle is not traveling on a roadway) to the roadway, the prohibition of the execution of the deceleration assistance control may be released. By virtue of such a configuration, it is possible to release the prohibition of the execution of the deceleration assistance control without requiring the driver's operation and it is also possible to appropriately execute the deceleration assistance control when the host vehicle is traveling on a roadway.

Alternatively, in another aspect of the driving assistance apparatus, if it is determined that the host vehicle is not traveling on a roadway, the restraining device is configured to restrain the execution of the deceleration, assistance control by the controller, by making it difficult to satisfy the predetermined condition, in comparison with the situation in which it is determined that the host vehicle is traveling on a roadway. According to this aspect, it is possible to restrain or prevent the execution of the deceleration assistance control, relatively easily.

Alternatively, in another aspect of the driving assistance apparatus, if it is determined that the host vehicle is not traveling on a roadway, the restraining device is configured to turn off a function of the controller associated with the execution of the deceleration assistance control. In this aspect, if it is determined that the host vehicle is not traveling on a roadway, the function associated with the execution of the deceleration assistance control is turned off. It is thus possible to prevent the driver from feeling discomfort due to the deceleration assistance control when the host vehicle is not traveling on a roadway.

In this aspect, if it is determined that the host vehicle is traveling on a roadway when the function is off, the restraining device may be configured to turn on the function. By virtue of such a configuration, it is possible to turn on the function associated with the execution of the deceleration assistance control without requiring the driver's operation and it is also possible to appropriately execute the deceleration assistance control when the host vehicle is traveling on a roadway.

A driving assistance apparatus according to another aspect of embodiments of the present disclosure is provided with: a controller programmed to execute a deceleration assistance control of assisting a host vehicle in decelerating when a predetermined condition is satisfied; a determinator configured to determine whether or not the host vehicle is in a parking lot; and a restraining device configured to restrain execution of the deceleration assistance control by the controller of it is determined that the host vehicle is in a parking lot, in comparison with a situation in which it is determined that the host vehicle is not in a parking lot.

In the embodiments described above, the "system controller 13" corresponds to a example of the "controller", the "roadway determination device 14" corresponds to an example of the "determinator", and the "system operation permission device 15" corresponds to an example of the "restraining device".

The determinator is configured to determine whether or not the host vehicle is in a parking lot. The determinator may determine that the host vehicle is in a parking lot, for example, on condition that a relatively short white line for defining a parking space, or the like, is recognized. The determinator may determine whether or not the host vehicle is in a parking lot, on the basis of the state of the host vehicle (e.g., the speed, etc.).

In a place other than a roadway, especially in a parking lot, the deceleration assistance control may be excessively executed due to parked vehicles. On the driving assistance apparatus, as described above, if it is determined that the host vehicle is in a parking lot, the execution of the deceleration assistance control by the controller is restrained, in comparison with the situation in which it is determined that the host vehicle is not in a parking lot. On the other hand, if it is determined that the host vehicle is not in a parking lot, the execution of the deceleration assistance control by the controller is not restrained, in comparison with a situation in which it is determined that the host vehicle is in a parking lot. Therefore, according to the driving assistance apparatus, it is possible to execute the deceleration assistance control while preventing the driver from feeling discomfort.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to:
   execute a deceleration assistance control of assisting in decelerating a host vehicle when a predetermined condition is satisfied;
   determine that the host vehicle is traveling on a roadway when there is a traffic light or a stop sign ahead of the host vehicle in a course thereof;
   restrain execution of the deceleration assistance control when it is not determined that the host vehicle is traveling on a roadway, in comparison with a situation in which it is determined that the host vehicle is traveling on a roadway; and
   when it is determined that the host vehicle is traveling on a roadway when the execution of the deceleration assistance control is prohibited, release prohibition of the execution of the deceleration assistance without requiring a driver's operation.

2. The driving assistance apparatus according to claim 1, further configured to prohibit the execution of the deceleration assistance control when it is not determined that the host vehicle is traveling on a roadway.

3. The driving assistance apparatus according to claim 1, wherein the predetermined condition is satisfied when a distance between a recognized deceleration target and the host vehicle is less than or equal to a predetermined distance, and
when it is not determined that the host vehicle is traveling on a roadway, the driving assistance apparatus is configured to restrain the execution of the deceleration assistance control by reducing the predetermined distance, in comparison with the situation in which it is determined that the host vehicle is traveling on a roadway.

4. The driving assistance apparatus according to claim 1, further configured to, when it is not determined that the host vehicle is traveling on a roadway, turn off a function associated with the execution of the deceleration assistance control.

5. The driving assistance apparatus according to claim 4, further configured to, when it is determined that the host vehicle is traveling on a roadway when the function is off, turn on the function.

6. The driving assistance apparatus according to claim 1, further configured to determine that the host vehicle is not traveling on a roadway when it is immediately after switching from ignition off to ignition of or a certain time has not passed since the switching.

7. The driving assistance apparatus according to claim 1, further configured to determine that the host vehicle is not traveling on a roadway when a shift position is in a predetermined range and a state of being 0 km/h continues for a predetermined time or longer.

8. A driving assistance apparatus configured to:
execute a deceleration assistance control of assisting in decelerating a host vehicle when a predetermined condition is satisfied;
determine that the host vehicle is in a parking lot when a frame line that defines a parking space is recognized;
restrain execution of the deceleration assistance control when it is determined that the host vehicle is in a parking lot, in comparison with a situation in which it is not determined that the host vehicle is in a parking lot; and
when it is determined that the host vehicle is traveling on a roadway when the execution of the deceleration assistance control is prohibited, release prohibition of the execution of the deceleration assistance control without requiring a driver's operation.

* * * * *